United States Patent
Ottenschlaeger

[11] Patent Number: 5,600,950
[45] Date of Patent: Feb. 11, 1997

[54] EXHAUST GAS PIPE

[75] Inventor: Josef Ottenschlaeger, Tettnang, Germany

[73] Assignee: MTU Motoren-und Turbinen-Union Friedrichshafen GmbH, Friedrichshafen, Germany

[21] Appl. No.: 545,686

[22] PCT Filed: Apr. 29, 1994

[86] PCT No.: PCT/EP94/01374

§ 371 Date: Nov. 13, 1995

§ 102(e) Date: Nov. 13, 1995

[87] PCT Pub. No.: WO94/27036

PCT Pub. Date: Nov. 24, 1994

[30]    Foreign Application Priority Data

May 15, 1993 [DE] Germany .................. 43 16 333.5

[51] Int. Cl.⁶ .................................................. F01N 7/10
[52] U.S. Cl. ................................................ 60/321; 60/323
[58] Field of Search ........................ 60/321, 322, 323

[56]    References Cited

U.S. PATENT DOCUMENTS

| | | | |
|---|---|---|---|
| 4,168,610 | 9/1979 | Engquist | 60/323 |
| 4,179,884 | 12/1979 | Koeslin | 60/323 |
| 4,184,329 | 1/1980 | Ruesch | 60/322 |
| 5,189,879 | 3/1993 | Sudmanns | 60/321 |
| 5,337,559 | 8/1994 | Deutschmann | 60/321 |
| 5,495,873 | 3/1996 | Butkiewicz et al. | 60/321 |

FOREIGN PATENT DOCUMENTS

| | | |
|---|---|---|
| 0469171 | 2/1992 | European Pat. Off. |
| 1158758 | 12/1963 | Germany . |
| 3635478 | 2/1988 | Germany . |
| 4021326 | 9/1991 | Germany . |

*Primary Examiner*—John T. Kwon
*Attorney, Agent, or Firm*—W. G. Fasse; W. F. Fasse

[57]    ABSTRACT

An exhaust gas pipe for multicylinder, supercharged internal combustion engines has an outer gas-tight casing (2) and an inner hot gas pipe (1) made up of segments (5) of cast parts securable by screws (8) which project into the casing (2) from the outside.

5 Claims, 3 Drawing Sheets

EXHAUST GAS PIPE

FIELD OF THE INVENTION

The invention relates to an exhaust gas pipe especially for charged multi-cylinder internal combustion engines.

BACKGROUND INFORMATION

Exhaust gas pipes with an encapsulation cause a minimal heat loss from the exhaust gas and are used preferably where the energy of the exhaust gas is to be converted into work in a down-stream turbo-charger or when the surface temperature of the exhaust gas pipe shall be kept low.

German Patent Publication (DE-PS) 3,635,478 discloses an encapsulated exhaust gas pipe for a turbo-charged internal combustion engine. An inner duct for the exhaust gases is arranged in a gas-tight housing. The inner duct is assembled from individual sections, whereby the length of one section corresponds approximately to the spacing between cylinders of the internal combustion engine. The sections consist each of two groove-type channels with flanges. The flanges are connected to the housing by screws. Cover strips apply a force to the groove-type channels to damp vibrations of the groove-type channels.

The production of the inner sections of two parts leads to increased costs in keeping these parts in stock and in mounting these parts. The mounting of the exhaust gas pipe with cover strips requires a careful adaptation and is thus cost intensive.

OBJECT OF THE INVENTION

It is the object of the present invention to provide an exhaust gas pipe which is economical, vibration damped and simple to mount.

SUMMARY OF THE INVENTION

The object has been achieved in an exhaust gas pipe for a multi-cylinder charged internal combustion engine with an outer gas-tight housing and an inwardly disposed exhaust gas pipe made of single piece cast segments, the length of which corresponds to the cylinder spacings of the internal combustion engine, according to the invention in that the segments comprise projections opposite an inlet opening at the circumference of the segments, wherein the projections rest against projections of the gas-tight housing provided at the inner circumference thereof, and wherein the segments are connected at this point to the gas-tight housing by screws which are externally accessible.

The inwardly disposed hot gas pipe can be produced in an especially cost efficient manner by lost wax (precision) casting or by normal casting. The segments can be provided already during the production with projections for the screw holes without any additional costs. A cost intensive separate stocking of different components is avoided. It is no longer necessary during the mounting of the segments to the outer housing of the exhaust gas pipe to assemble separate components possibly at locations that are difficult to access. Rather, the mounting is very much simplified with a single segment that can be connected externally by means of screws. The compensation of heat stresses between components of the inner hot gas pipe during operation of the exhaust gas pipe is no longer needed. The support of the segments takes place at the projections so that vibrations are substantially suppressed.

Preferably each of the segments is secured with two screws at the outer housing, whereby the screws extend crosswise or lengthwise next to each other. This is an especially cost efficient method to connect the segments with the outer housing in a manner secure against torque loads.

According to a further advantageous embodiment of the present invention the segments are screwed to the outer housing at positions respectively opposite of the gas inlet openings from the internal combustion engine into the exhaust gas pipe. Due to the fact that the gas impulses are directed from the combustion engine directly onto the screw connection of the segments with the outer housing, the segment is hardly excited to generate vibration, so that an additional device for vibration damping is not needed.

An especially flow efficient embodiment of the inner hot gas pipe which is stable in itself is achieved with tubular segments having a circular or oval cross-section.

Preferably, the outer housing is provided with water cooling in order to keep the surface temperature of the exhaust gas pipe low.

BRIEF DESCRIPTION OF THE DRAWINGS

The invention will now be described in detail in the following with reference to example embodiments illustrated in the accompanying drawings, wherein.

DETAILED DESCRIPTION OF A PREFERRED EXAMPLE AND OF THE BEST MODE OF THE INVENTION

Figure 1:
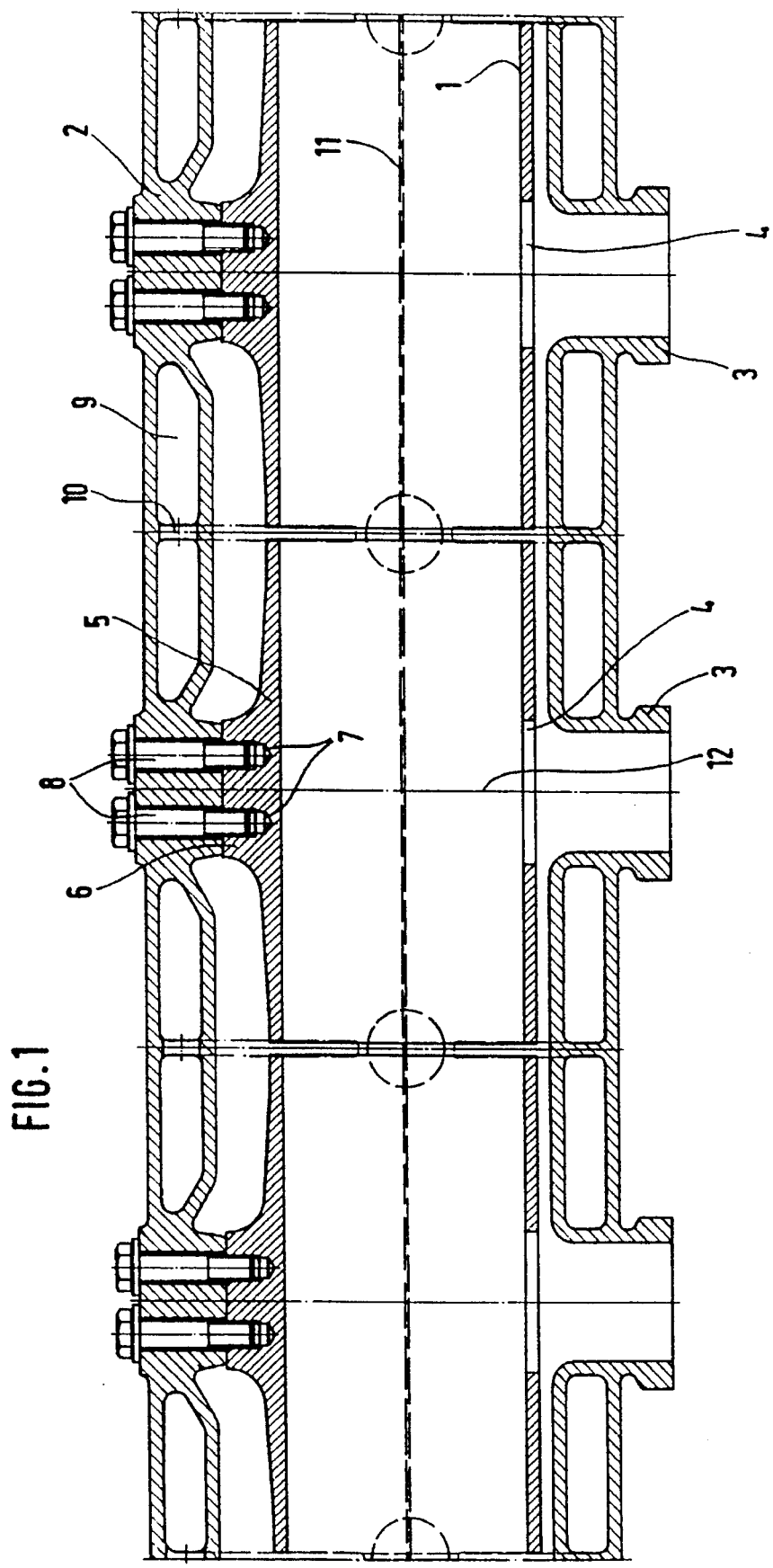
FIG. 1 shows a longitudinal cross-section through an exhaust gas pipe according to the invention.
Figure 2:
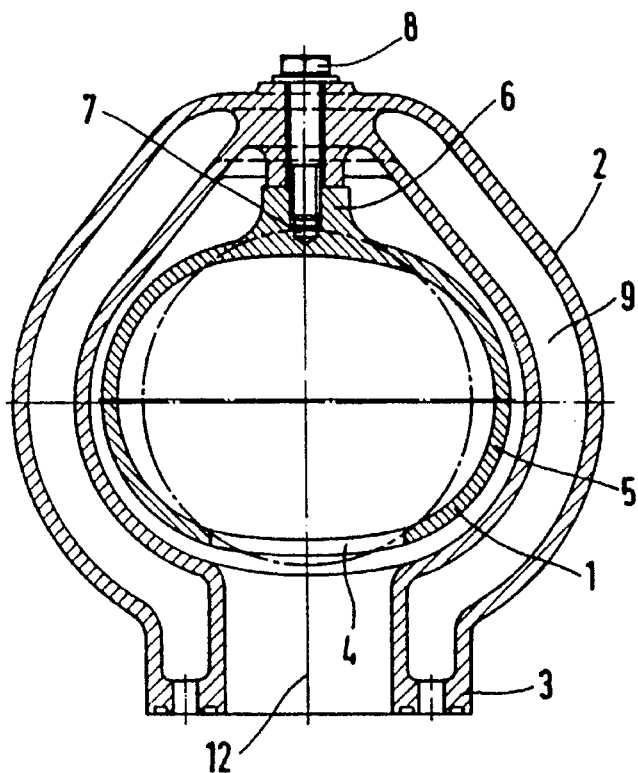
FIG. 2 shows a cross-section perpendicularly to the longitudinal axis of the exhaust gas pipe according to FIG. 1.

FIG. 1 shows an exhaust gas pipe according to the invention adapted to an internal combustion engine having three cylinders not shown. The sequential arrangement of a corresponding number of such exhaust gas pipes permits varying the length of the exhaust gas pipe in accordance of the number of cylinders of the internal combustion engine.

The exhaust gases from the cylinders are introduced to an inner hot gas pipe 1 which is secured to a gas-tight, liquid cooled outer housing 2. The outer housing 2 comprises exhaust gas flanges 3 which are directed toward respective inlet openings 4 of the inner hot gas pipe 2 but are not connected therewith. The inner hot gas pipe 1 is assembled of individual segments 5 of uniform configuration. Each segment 5 is tubular or pipe-like and has a substantial circular or oval cross-section. The length of the segment 5 is approximately equal to the cylinder spacing of the internal combustion engine. The inlet opening 4 is arranged in the center of the axial length of each segment 5. Opposite the inlet opening 4, each segment 5 comprises a cast projection 6. Screw holes 7 are provided in the projection 6 for taking up screws 8. At the projection 6, the segments 5 rest against the inner circumference of the housing 2 in such a manner that the heat transfer to the housing 2 is small. Two screws 8 are screwed with a short spacing into each of the projections 6 for connecting the segments 5 from the outside through the housing 2 in a manner safe against torque and providing a vibration damping connection. The screws are positioned in the direction toward the longitudinal axis 11 of the exhaust pipe and symmetrically to the axis 12 of the exhaust gas flanges 3.

The outer housing of the exhaust gas pipe comprises hollow spaces 9 for holding cooling liquid. The cooling liquid of the internal combustion engine can circulate also in the outer housing 2 without any intermediate conduits. The hollow spaces 9 may be equipped with intermediate walls 10 for stiffening.

Figure 4:
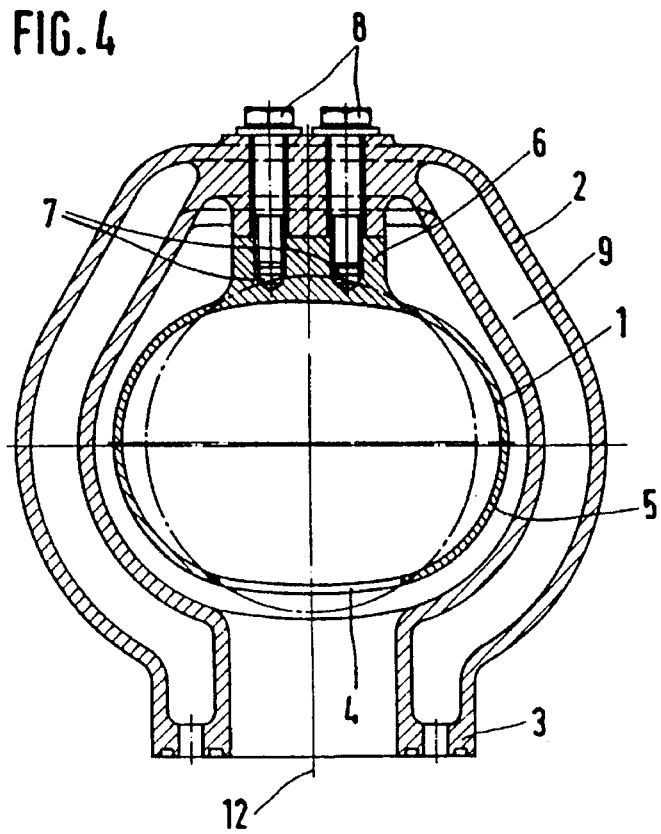
FIGS. 3 and 4 show an exhaust gas pipe according to the invention with an advantageous embodiment of the mounting.
Figure 3:
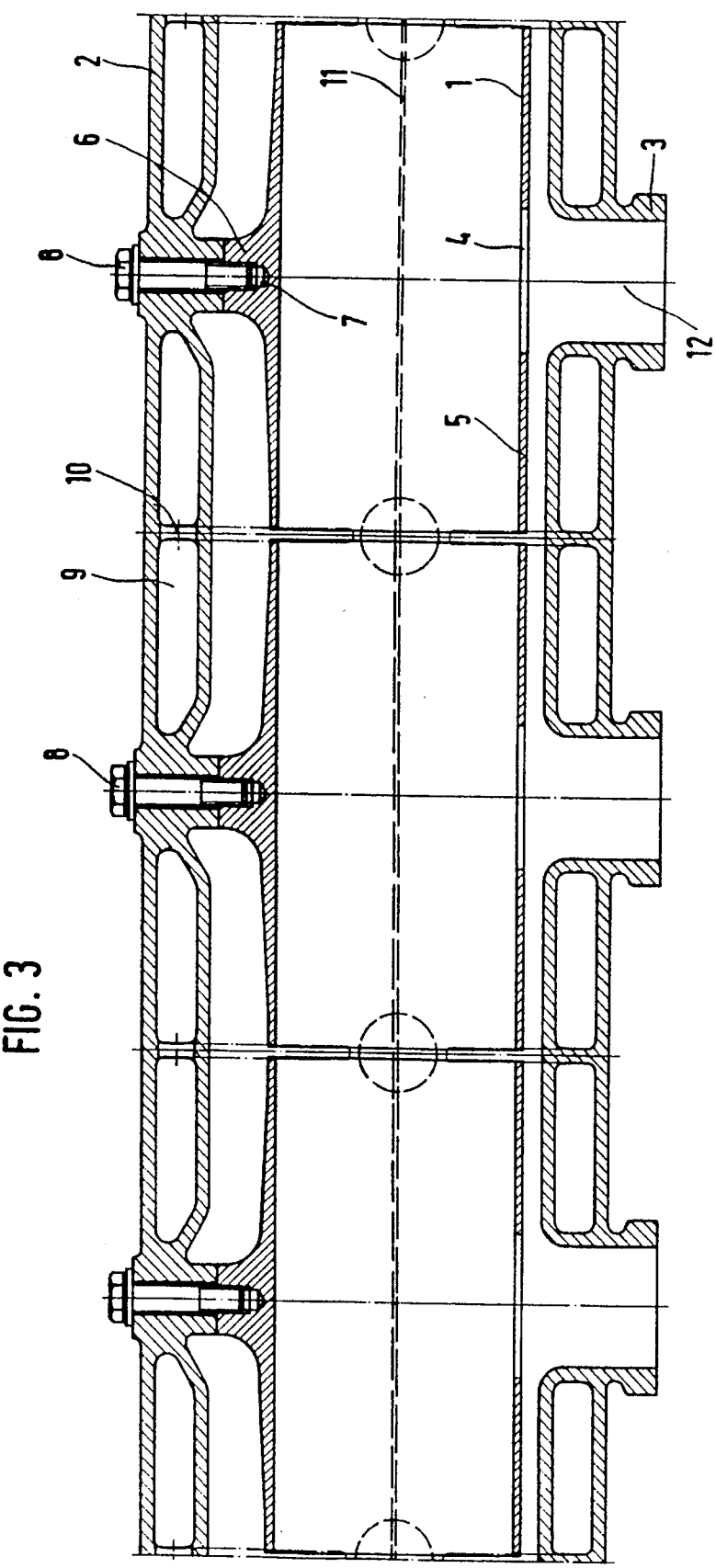

According to FIGS. 3 and 4, the screws 8 for the torsion stiff attachment of the segments 5 of the inner hot gas pipe 11 to the outer housing 2 are arranged in a plane perpendicularly to the longitudinal axis 11 of the exhaust gas pipe through the axis 12 of the exhaust gas flanges 3 with a short spacing from each other in each of the projections 6 symmetrically to the axis 12.

What I claim is:

1. An exhaust gas pipe for a multi-cylinder charged internal combustion engine with an outer gas-tight housing (2) and an inwardly disposed exhaust gas pipe (1) made of single piece cast segments (5), the length of which corresponds to the cylinder spacings of the internal combustion engine, characterized in that the segments (5) comprise projections (6) opposite an inlet opening (4) at the circumference of the segments, said projections (6) resting against projections of the housing (2) provided at the inner circumference thereof, and wherein said segments are connected at this point with said housing (2) by screws (8) which are externally accessible.

2. The exhaust gas pipe according to claim 1, wherein each of the projections (6) can take up two screws (8) positioned next to each other in a direction perpendicularly to the longitudinal axis (11).

3. The exhaust gas pipe according to claim 1, wherein the screws (8) are arranged opposite the inlet opening (4).

4. The exhaust gas pipe according to claim 1, wherein the segments (5) are tubular with a round or oval cross-section.

5. The exhaust gas pipe according to claim 1, wherein the outer housing (2) is water-cooled.

* * * * *